(12) United States Patent
Sahoo et al.

(10) Patent No.: US 11,654,910 B2
(45) Date of Patent: May 23, 2023

(54) WHEEL LEAN AUTOMATION SYSTEM AND METHOD FOR SELF-PROPELLED WORK VEHICLES

(71) Applicant: Deere & Company, Moline, IL (US)

(72) Inventors: Sambhav Sahoo, Rourkela (IN); Vishal Chaubey, New Delhi (IN); Craig Christofferson, Dubuque, IA (US)

(73) Assignee: Deere & Company, Moline, IL (US)

( * ) Notice: Subject to any disclaimer, the term of this patent is extended or adjusted under 35 U.S.C. 154(b) by 192 days.

(21) Appl. No.: 17/143,210

(22) Filed: Jan. 7, 2021

(65) Prior Publication Data

US 2022/0126827 A1 Apr. 28, 2022

(30) Foreign Application Priority Data

Oct. 23, 2020 (IN) .............................. 202021046302

(51) Int. Cl.
*B60W 60/00* (2020.01)
*B60W 30/18* (2012.01)
*B62D 15/02* (2006.01)

(52) U.S. Cl.
CPC .... *B60W 30/18018* (2013.01); *B60W 60/001* (2020.02); *B62D 15/021* (2013.01); *B60W 2300/15* (2013.01); *B60W 2422/70* (2013.01)

(58) Field of Classification Search
None
See application file for complete search history.

(56) References Cited

U.S. PATENT DOCUMENTS

| | | | |
|---|---|---|---|
| 8,412,420 B2 | 4/2013 | Ruhter et al. | |
| 8,424,632 B2 | 4/2013 | Ruhter et al. | |
| 9,227,478 B2 | 1/2016 | Horstman | |
| 9,637,889 B2 | 5/2017 | Elkins | |

(Continued)

FOREIGN PATENT DOCUMENTS

| | | |
|---|---|---|
| DE | 10304916 A1 | 8/2004 |
| DE | 102019132168 A1 | 6/2020 |
| JP | S5281825 A | 7/1977 |

OTHER PUBLICATIONS

German Search Report issued in application No. DE102021210385.5 dated Apr. 25, 2022 (10 pages).

*Primary Examiner* — James M McPherson
(74) *Attorney, Agent, or Firm* — Gary L. Montle; Lucran Wayne Beavers; Patterson Intellectual Property Law, PC

(57) ABSTRACT

Systems and methods are disclosed herein for automatically controlling wheel lean in a work vehicle (e.g., a motor grader) comprising a front portion with an axle and a plurality of traction wheels configured to lean at a wheel-lean angle relative thereto. Based on output signals from one or more sensors mounted on the work vehicle, work conditions are detected comprising an actual wheel-lean angle of at least one wheel relative to the axle, an oscillation angle of the axle, and a slope of the terrain. In automatic control operations, wheel lean is automatically directed to a predetermined orientation (e.g., corresponding to a direction of gravity), based at least on detected work conditions. Wheel lean may further be automatically directed based on detected steering inputs for positioning of the traction wheels and a detected articulation angle for positioning of the front portion of the work vehicle relative to the rear portion.

20 Claims, 6 Drawing Sheets

(56) References Cited

U.S. PATENT DOCUMENTS

| | | |
|---|---|---|
| 10,076,939 B2 | 9/2018 | Simon et al. |
| 10,704,226 B2 | 7/2020 | Yamaguchi et al. |
| 2006/0220335 A1* | 10/2006 | Damm .................. B62D 17/00 |
| | | 280/5.521 |
| 2015/0165856 A1* | 6/2015 | Horstman .......... B60G 17/0165 |
| | | 280/6.154 |
| 2016/0362870 A1* | 12/2016 | Elkins ..................... E02F 3/764 |
| 2020/0173135 A1* | 6/2020 | Gentle ...................... E02F 9/26 |

* cited by examiner

WHEEL LEAN AUTOMATION SYSTEM AND METHOD FOR SELF-PROPELLED WORK VEHICLES

FIELD OF THE DISCLOSURE

The present disclosure relates generally to self-propelled work vehicles such as motor graders having one or more wheels that are configured to lean in accordance with one or more work applications, and more particularly to systems and methods for automating wheel lean in such self-propelled work vehicles.

BACKGROUND

Self-propelled work vehicles as discussed herein may generally include any such vehicles include one or more wheels being configured, or otherwise associated with linkage mechanisms configured, to lean relative to a frame of the work vehicle. Motor graders are used herein as the illustrative example of such self-propelled work vehicles, but are not exclusively intended as such unless otherwise specifically stated.

In many work applications, it is necessary or at least desirable to cause one or more wheels of a self-propelled work vehicle such as a motor grader to lean, i.e., adjust their orientations relative to portions of the vehicle frame and/or axle. For example, while grading on a slope (banking operation), wheel lean is performed manually to achieve the required stability. While banking during a heavy grading operation, wheel lean is further implemented to follow a straight path. While a particular lean is achieved, the operator may further need to set the required lean multiple times during multiple passes based on the ground conditions. In cornering conditions while grading, the operator may still further need to implement or adjust a wheel lean operation in order to obtain a minimum turning radius.

In conventional operations, wheel lean is performed manually using joysticks or as one of an 'antler rack' of control interface tools, and a substantial amount of skill is required for the operator to lean the wheel precisely during various grading operations. This can lead to operator fatigue, as frequently the operation requires leaning of the wheels to either of left or right extremes. Also, without precise feedback the operator is frequently unable to determine that the wheels are oriented in a preferred manner (e.g., vertically oriented, in a direction corresponding to the direction of gravity), which leads to tire wear.

BRIEF SUMMARY

The current disclosure provides an enhancement to conventional systems, at least in part by introducing a novel system and method for implementing automation of wheel lean operation and associated functions.

Various embodiments of such enhancements as disclosed herein may desirably enable wheels to be leaned automatically during operations on slopes, such as for example heavy grading, further while negotiating cornering conditions, and generally keeping the wheel vertical. Machine learning algorithms may be used to learn the wheel lean preferences of an operator during various operations, as well as decisions made during multiple passes. These enhancements may provide benefits such as increases in operator productivity, reduction in operator fatigue, improved wheel lean precision, precision grading, reduced tire wear, and stability of the work vehicle on slopes.

In one embodiment, a method as disclosed herein is provided for automatically controlling wheel lean in a work vehicle comprising an axle associated with a front portion of the work vehicle, and a plurality of traction wheels coupled to the axle and configured to lean at a wheel-lean angle relative thereto. Steps according to the method include detecting, based on output signals from one or more sensors mounted on the work vehicle, work conditions comprising an actual wheel-lean angle of at least one of the plurality of traction wheels relative to the axle, an oscillation angle of the axle, and a slope of terrain upon which the work vehicle is traveling; and responsive to a selected automatic control operation, automatically directing leaning of the plurality of traction wheels to a predetermined orientation, based on at least the detected work conditions.

In an exemplary aspect according to the above-referenced embodiment, the method may further include, responsive to at least a first selected automatic control operation, automatically directing leaning of the plurality of traction wheels to an orientation corresponding to a direction of gravity, based on at least the detected work conditions.

In another exemplary aspect according to the above-referenced embodiment, feedback from the first sensor is received for at least confirming the directed leaning of the plurality of the traction wheels.

In another exemplary aspect according to the above-referenced embodiment, the front portion of the work vehicle may be articulable relative to the rear portion, wherein the method may further include automatically directing leaning of the plurality of traction wheels further based on detected steering inputs for positioning of the traction wheels and a detected articulation angle for positioning of the front portion of the work vehicle relative to the rear portion.

In another exemplary aspect according to the above-referenced embodiment, the detected work conditions may further comprise a yaw rotation of a respective portion of the work vehicle about an axis transverse to a working direction of the work vehicle and substantially normal to the terrain, and the method further includes determining a target yaw rotation based on the detected steering inputs and the detected articulation angle, and directing leaning of the plurality of traction wheels based at least in part on a comparison of a detected yaw rotation with respect to the target yaw rotation.

In another exemplary aspect according to the above-referenced embodiment, the selected automatic control operation being one of one or more selectable automatic control operations, the method further includes enabling, via a user interface, user selection from among the one or more automatic control operations and at least one manual control operation, and at least during the at least one manual control operation, directing a display of the actual wheel-lean angle via the user interface.

In another exemplary aspect according to the above-referenced embodiment, the method further includes, during the at least one manual control operation, monitoring manual control inputs regarding leaning of the plurality of traction wheels in accordance with associated work conditions, and storing control data based thereon, and during at least one of the one or more selectable automatic control operations, implementing the stored control data responsive to the associated work conditions.

In another exemplary aspect according to the above-referenced embodiment, a selected first automatic control operation comprises automatic directing of the leaning of the plurality of traction wheels to an orientation corresponding to a direction of gravity, based on the detected work conditions, the front portion of the work vehicle is selectively articulable relative to the rear portion, and the method further includes, responsive to a selected second automatic control operation, automatically directing leaning of the plurality of traction wheels at least proportionate with respect to detected steering inputs for positioning of the traction wheels and a detected articulation angle for positioning of the front portion of the work vehicle relative to the rear portion.

In another exemplary aspect according to the above-referenced embodiment, feedback from the first sensor is received during the selected second automatic control operation for at least confirming the directed leaning of the plurality of the traction wheels.

In another exemplary aspect according to the above-referenced embodiment, the method further includes enabling, via a user interface, user selection from among a plurality of automatic control operations and at least one manual control operation, and during the at least one manual control operation, directing a display of the actual wheel-lean angle via the user interface, and during the at least one manual control operation, monitoring manual control inputs regarding leaning of the plurality of traction wheels in accordance with associated work conditions, and storing control data based thereon, and during at least one of the plurality of selectable automatic control operations, implementing the stored control data responsive to the associated work conditions.

In another embodiment as disclosed herein, a work vehicle is provided which includes an axle associated with a front portion of the work vehicle, and a plurality of traction wheels coupled to the axle and configured to lean at a wheel-lean angle relative thereto. A first sensor is configured to generate output signals representing an actual wheel-lean angle of at least one of the plurality of traction wheels relative to the axle. A second sensor is configured to generate output signals representing an oscillation angle of the axle. A third sensor is configured to generate output signals representing a slope of terrain upon which the work vehicle is traveling. A controller is functionally linked to receive the respective output signals from the first sensor, the second sensor, and the third sensor, and further characterized to direct performance of method steps according to the above-referenced embodiment and optionally any further exemplary aspects thereof.

In an exemplary aspect according to the embodiment of the work vehicle described above, the first sensor may comprise an encoder integrated within a hydraulic cylinder associated with at least one of the plurality of traction wheels.

In another exemplary aspect according to the embodiment of the work vehicle described above, the third sensor may comprise an inertial measurement unit configured to generate output signals further representing a yaw rotation of a respective portion of the work vehicle about an axis transverse to a working direction of the work vehicle and substantially normal to the terrain.

In another exemplary aspect according to the embodiment of the work vehicle described above, the third sensor may be mounted on the rear portion of the work vehicle.

In another exemplary aspect according to the embodiment of the work vehicle described above, a user interface is configured to enable user selection from among one or more selectable automatic control operations and at least one manual control operation, and the control unit being configured at least during the at least one manual control operation to direct the display of the actual wheel-lean angle via the user interface.

In another exemplary aspect according to the embodiment of the work vehicle described above, the work vehicle is a motor grader.

Numerous objects, features and advantages of the embodiments set forth herein will be readily apparent to those skilled in the art upon reading of the following disclosure when taken in conjunction with the accompanying drawings.

DETAILED DESCRIPTION

Referring now to FIGS. 1-7, various embodiments may now be described of a system and method for automated wheel lean on a self-propelled work vehicle.

Figure 1:
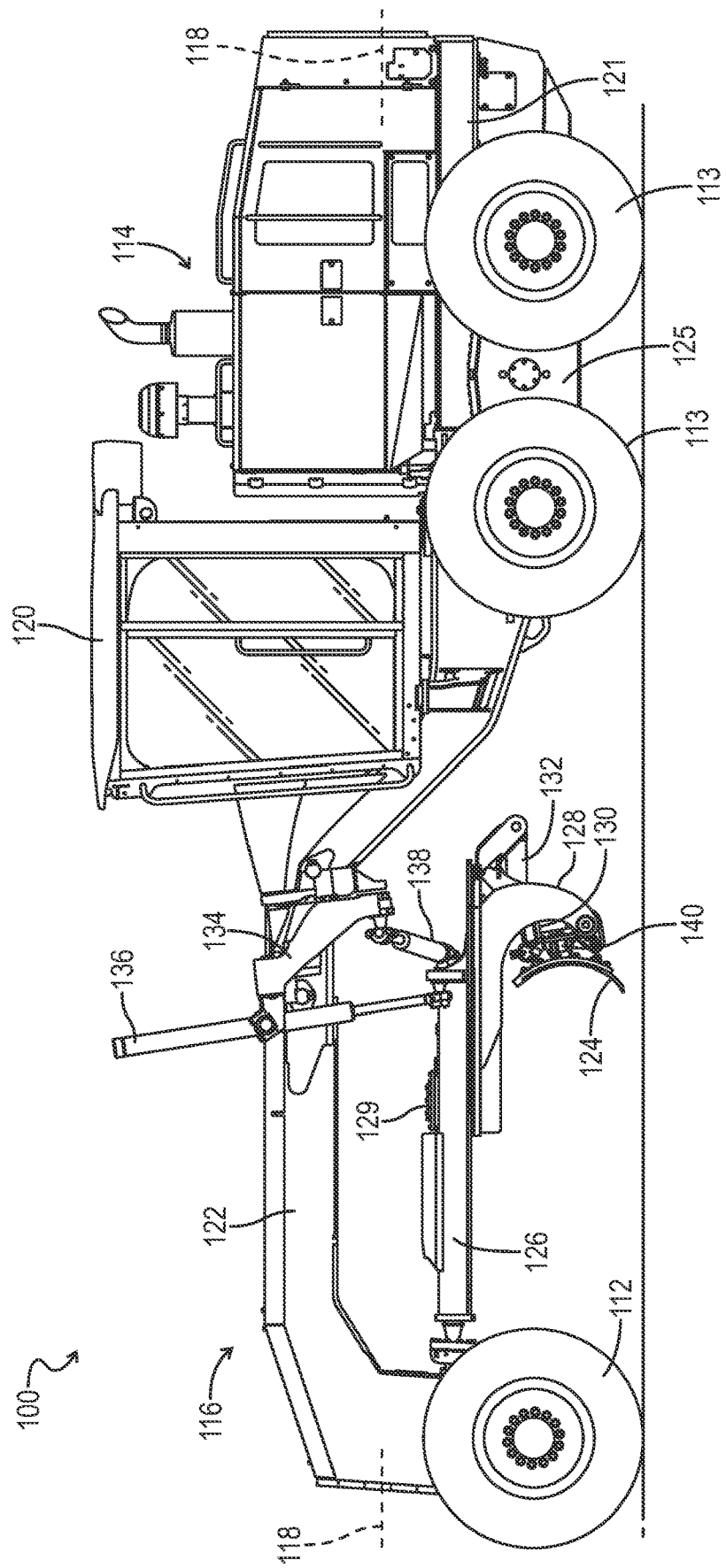
FIG. 1 is a side view of a motor grader as an exemplary self-propelled work vehicle according to an embodiment as disclosed herein.

FIG. 1 in a particular embodiment as disclosed herein shows a representative self-propelled work vehicle 100 in the form of, for example, a motor grader which has two leanable front traction wheels 112 and four non-leanable rear traction wheels 113.

The self-propelled work vehicle 100 has rear and front portions 114, 116, respectively. An engine frame 121 of the rear portion 114 and a main frame 122 of the front portion 116 are articulated to one another (as further illustrated in FIG. 7) at an articulation joint 170 for steering of the self-propelled work vehicle 100 left and right using a left articulation cylinder 172 and a right articulation cylinder 174, the articulation cylinders coupled to and extending between the rear and front portions 114, 116. As used herein, terms such as "left" and "right" may generally be considered relative to a central fore-aft axis 118 of the self-propelled work vehicle 100.

The rear portion 114 includes an internal combustion engine (e.g., diesel engine) of the self-propelled work vehicle 100 and a tandem 125 on each side of the vehicle 100, only the left tandem being illustrated. Each tandem 25 has two traction wheels 113 that may be driven by the engine of the self-propelled work vehicle 100 through a transmission for propulsion of the self-propelled work vehicle 100, each tandem 25 having a chain drive with two chains each between a tandem axle and a respective wheel 113. The rear portion 114 thus has four of the six traction wheels of the self-propelled work vehicle 100, two on the left with one in front of the other and two on the right with one in front of the other.

The front portion 116 has an operator's station 120 from which a human operator can control the self-propelled work vehicle 100. The operator's station 120 may include a user interface 230 (not shown in FIG. 1 but represented as part of the control system 200 in FIG. 2). The term "user interface" 230 as used herein may broadly take the form of a display unit and/or other outputs from the system such as indicator lights, audible alerts, and the like. The user interface may further or alternatively include various controls or user inputs (e.g., a steering wheel, joysticks, levers, buttons) for operating the self-propelled work vehicle 100, including operation of the engine, hydraulic cylinders, and the like. Such an onboard user interface may be coupled to a vehicle control system via for example a CAN bus arrangement or other equivalent forms of electrical and/or electro-mechanical signal transmission. Another form of user interface (not shown) may take the form of a display that is generated on a remote (i.e., not onboard) computing device, which may display outputs such as status indications and/or otherwise enable user interaction such as the providing of inputs to the system. In the context of a remote user interface, data transmission between for example the vehicle control system and the user interface may take the form of a wireless communications system and associated components as are conventionally known in the art.

The front portion 116 of the self-propelled work vehicle 100 has a moldboard 124 mounted to the main frame 122 of the front portion 116. The moldboard 124 is configured for moving earthen or other material, and mounted for movement in a number of directions. A draft frame 126 is coupled to the main frame 122 toward the front via a ball-and-socket joint. A circle frame 128 is coupled to the draft frame 126 to rotate relative thereto by use of a circle drive 129 mounted to the draft frame 126. A tilt frame 130 holds the moldboard 124 and is coupled pivotally to the circle frame 128 for pivotal movement of the tilt frame 130 and the moldboard 124 held thereby relative to the circle frame 128 about a tilt axis by use of a tilt cylinder 132. The tilt cylinder 132 is connected to the circle frame 128 and the tilt frame 130 there between to change the pitch of the tilt frame 130, and thus the moldboard 124, relative to the circle frame 128. The moldboard 124 is coupled to the circle frame 128 through the tilt frame 130 to rotate with the circle frame 128 relative to the draft frame 126.

A saddle 134 is mounted to the main frame 122. Left and right blade-lift cylinders 136 (only the left blade-lift cylinder is shown) are connected to the saddle 134 and the draft frame 126 there between for raising and lowering the sides of the draft frame 126, and thus the moldboard 124, relative to the main frame 122. A circle side-shift cylinder 138 is connected to the saddle 134 and the draft frame 126 there between to side-shift the draft frame 126 and circle frame 128, and thus the moldboard 124, relative to the main frame 122.

A moldboard side-shift cylinder 140 is connected to the tilt frame 130 and the moldboard 124 there between. The moldboard side-shift cylinder 140 is operable to move the moldboard 124 in translation relative to the tilt frame 130 along a longitudinal axis of the moldboard 124.

Figure 2:
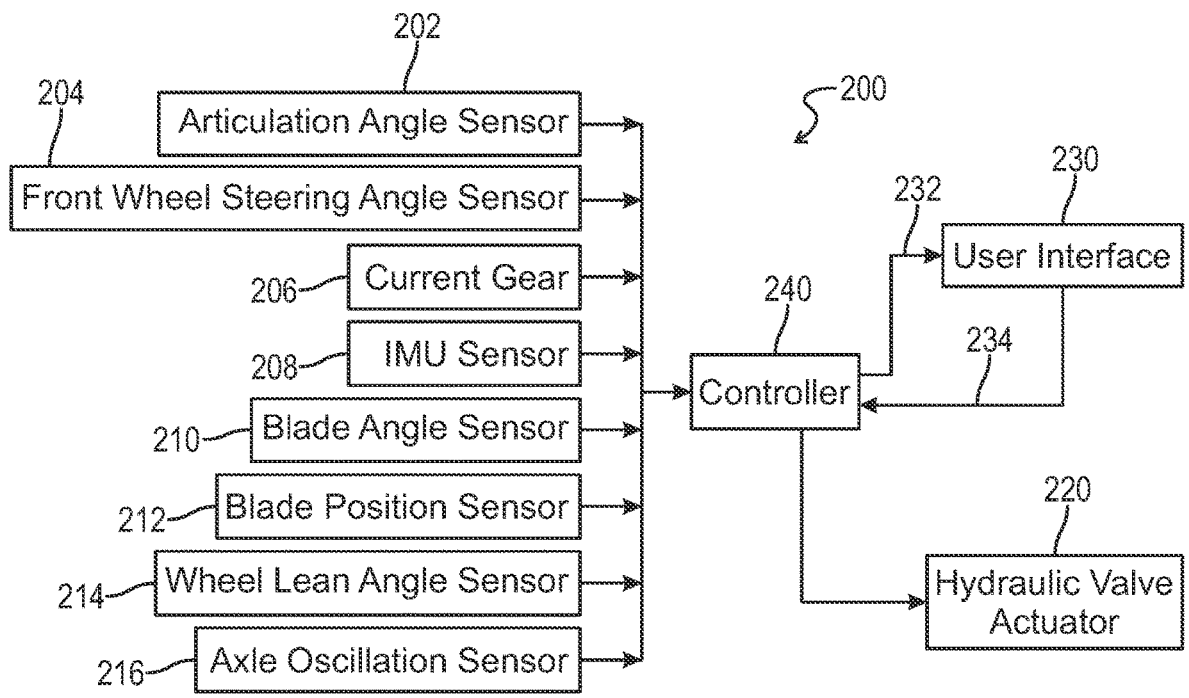
FIG. 2 is a block diagram representing an exemplary control system according to an embodiment as disclosed herein.

Referring next to FIG. 2, a control system 200 is provided in association with the self-propelled work vehicle 100, wherein multiple inputs are provided to a controller 240 for calculation of, e.g., the exact tilt angle required for the wheel lean control implementation.

An articulation angle sensor 202 may generate signals to the controller 240 which correspond to the angle of articulation 182 of the front section 116 relative to the rear section 114 (or vice versa). The articulation angle sensor 202 may for example comprise a rotary encoder positioned at the articulation joint 170 to sense the articulation angle 182 and convert that angle into a voltage indicative of the articulation angle 182, wherein the controller 240 may receive that voltage and determine the articulation angle 182 using a look-up table stored in memory, interpolating as needed.

A front wheel steering angle sensor 204 generate signals to the controller 240 which correspond to the steering angle 180 of at least a first of the front wheels 112 (left or right) at the respective steering joint to sense the steering angle 180 of that wheel. The front wheel steering angle sensor 204 may be a rotary encoder positioned at either one of the two kingpins of the steering joint of the at least first front wheel 112, such as, for example, the upper kingpin, to sense the rotation of the kingpin, or, stated otherwise, the angular displacement of the spindle relative to the yoke from the position of the spindle when the respective front wheel 112 is perpendicular to an axis of the axle. The sensor 204 may convert the sensed angle into a voltage, which is received by the controller 240 which further may use, e.g., a look-up table stored in memory to determine the front wheel steering angle.

The current gear 206 may be provided as an input to the controller 240 from, e.g., a machine control unit, or an equivalent source as may be appreciated by one of skill in the art. For example, the controller 240 may be configured to automatically disable control functions according to the automatic wheel lean methods described herein if the gear is detected as being at a level corresponding to transportation speeds, such that the automated wheel lean functions are only implemented for grading or equivalent work operations.

One or more inertial measurement units (IMU's) 208 may also be arranged on respective components of the self-propelled work vehicle 100 and configured to generate outputs (e.g., respective three-axis acceleration and gyroscopic output signals) to the controller 240. For example, an IMU 208 may be implemented to measure the tilt of the self-propelled work vehicle along its X- and Y-axes on a slope during a banking operation, and further (or alternatively) to detect the moment along its Z-axis (yaw) due to heavy grading and while the self-propelled work vehicle is operating on the slope. Such measurements may for example be implemented as further described herein for comparing current (actual) yaw measurements from the IMU 208 versus a desired yaw value based on the sensed steering angle 180 and articulation angle 182.

Blade angle sensors 210 and blade position sensors 212 may comprise encoders integrated within respective hydraulic cylinders, such as for example the tilt cylinder 132, left and right blade-lift cylinders 136, and side-shift cylinders 138, 140 as previously described for positioning of the moldboard 124, and configured to generate output signals to the controller 240 representative of cylinder extension and accordingly the blade angle and the blade position, respectively.

One or more wheel lean angle sensors 214 may comprise encoders integrated within respective hydraulic cylinders, and configured to generate output signals to the controller 240 representative of cylinder extension and accordingly the respective wheel lean for a given wheel.

An axle oscillation sensor 216 may be mounted on an oscillation pin of the front axle and configured to generate output signals to the controller 240 representative of an axle oscillation angle.

The controller 240 may be part of the machine control system of the working machine, or it may be a separate control module. Accordingly, the controller 240 may generate control signals for controlling the operation of various actuators throughout the self-propelled work vehicle 100, which may for example include hydraulic valves 220 for controlling the wheel lean. Electronic control signals from the controller 240 may for example be received by electro-hydraulic control valves associated with respective actuators, wherein the electro-hydraulic control valves control the flow of hydraulic fluid to and from the respective hydraulic actuators to control the actuation thereof in response to the control signal from the controller 240. The controller 240 may include or be functionally linked to the user interface 230, for example to generate text, data and/or other indicia 232 such as the measured wheel lean angle(s) for display on an associated display unit, and/or to receive user inputs 234 from the user interface 230, and the controller 240 may optionally be mounted in the operator's station 120 at a control panel. As an illustrative example of user inputs 234 received by the controller 240 from the user interface 230, the user interface 230 may enable selective enabling and/or disabling by the operator of one or more of the various automatic control modes as described herein, or otherwise stated the operator may be able to selectively switch operating modes between a manual operating mode and any of one or more automatic operating modes depending on the operating conditions and/or practical applications of the self-propelled work vehicle 100.

The controller 240 may be configured to receive input signals from various additional sensors associated with the self-propelled work vehicle 100, including for example global positioning system (GPS) sensors, vehicle speed sensors, vehicle attachment implement positioning sensors, and the like, and whereas one or more of these sensors may be discrete in nature the controller 240 may receive associated signals provided from the machine control system.

A controller 240 in an embodiment may include or may be associated with a processor, a computer readable medium, a communication unit, data storage such as for example a database network, and the aforementioned user interface 230 or control panel having a display. An input/output device, such as a keyboard, joystick or other user interface tool, may be provided so that the human operator may input instructions to the controller 240. It is understood that the controller described herein may be a single controller having all of the described functionality, or it may include multiple controllers wherein the described functionality is distributed among the multiple controllers.

Various operations, steps or algorithms as described herein can be embodied directly in hardware, in a computer program product such as a software module executed by a processor, or in a combination of the two. The computer program product can reside in RAM memory, flash memory, ROM memory, EPROM memory, EEPROM memory, registers, hard disk, a removable disk, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

A communication unit may support or provide communications between the controller 240 and external systems or devices, and/or support or provide a communication interface with respect to the sensing elements and other internal components of the self-propelled work vehicle 100. The communications unit may include wireless communication system components (e.g., via cellular modem, WiFi, Bluetooth or the like) and/or may include one or more wired communications terminals such as universal serial bus ports.

Figure 3:
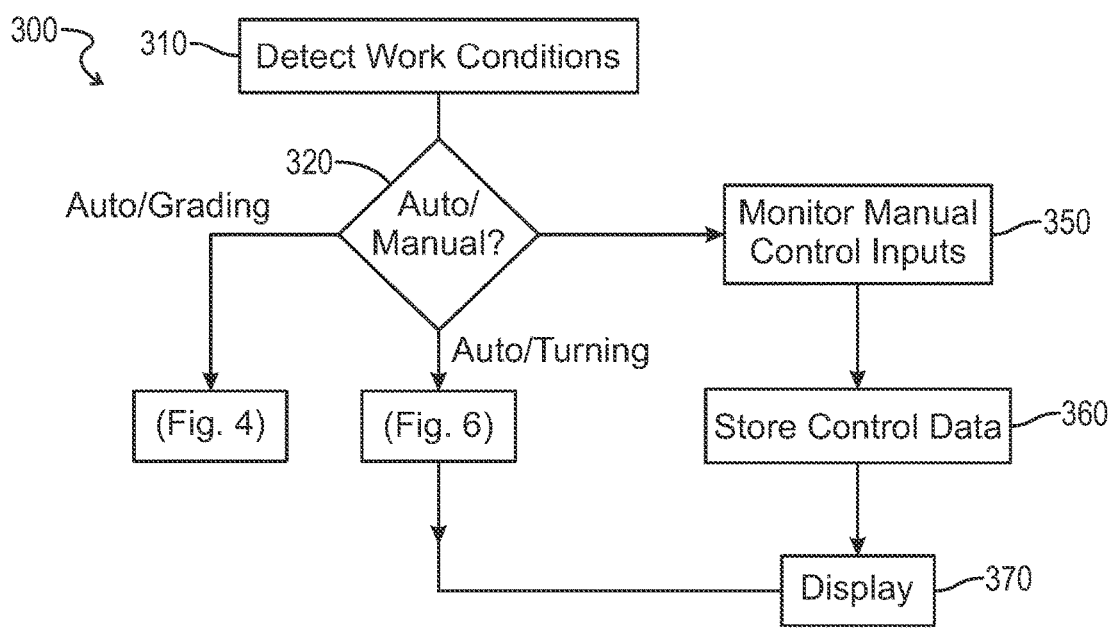
FIG. 3 is a flowchart representing an exemplary method according to an embodiment as disclosed herein.

An exemplary embodiment of a method 300 for wheel lean control may next be described, with illustrative reference to FIG. 3. As previously noted, the wheel lean control method may be dependent on whether or not the detected current gear of the self-propelled work vehicle 100 is representative of a working operation, and accordingly the following description assumes that a working operation such as for example grading is being undertaken, rather than transportation or other non-working equivalents.

As illustrated in an initial step 310, the controller 240 may detected various work conditions in accordance with inputs from the various sensors as described above. The remaining steps may largely be dependent on whether the operator has selected (step 320) a manual or automatic control mode.

Figure 4:
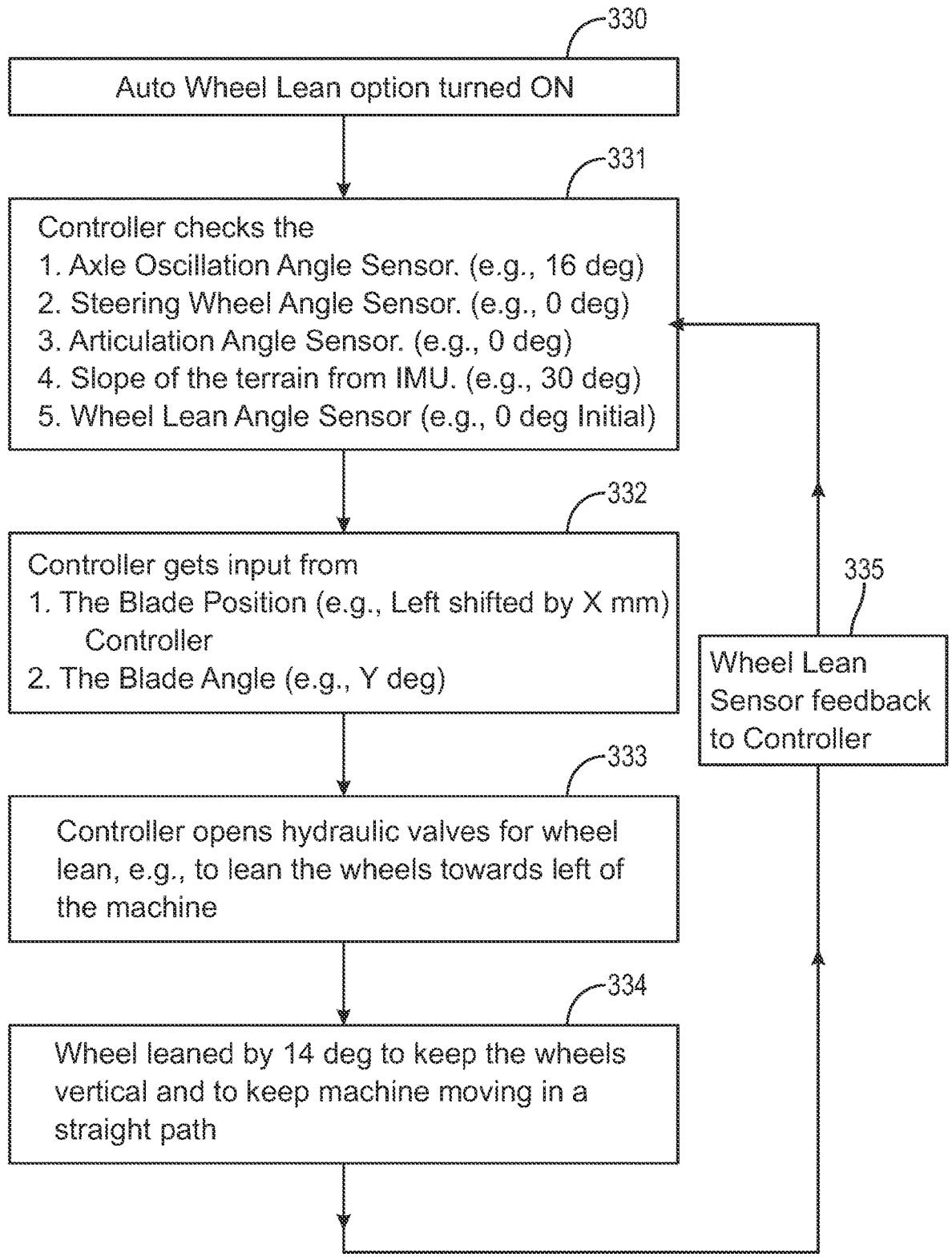
FIG. 4 is a flowchart representing an automated wheel lean control process at slope/banking position, or during grading, in accordance with the exemplary method illustrated in FIG. 3.
Figure 5:
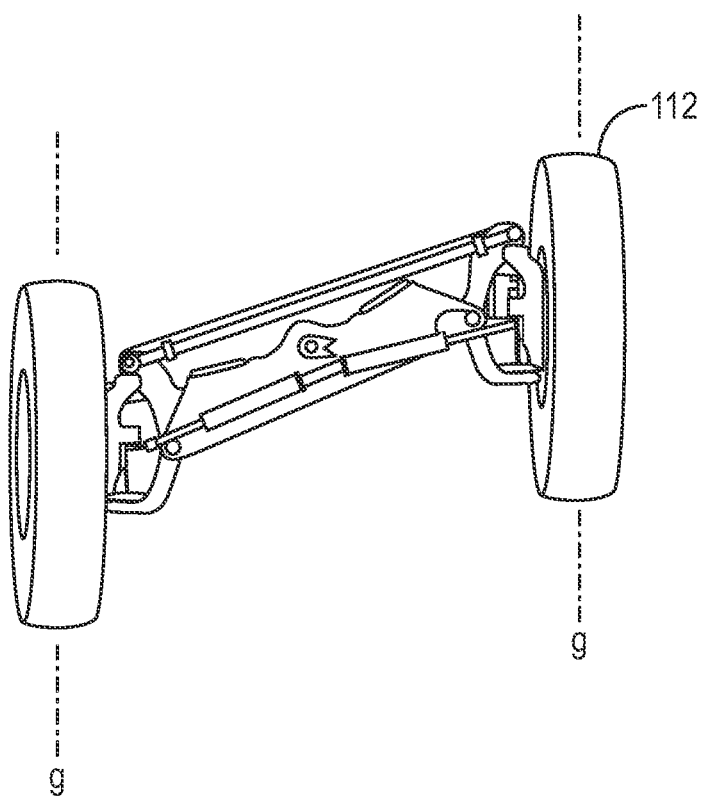
FIG. 5 is a representative partial front view of an axle and wheels from a front portion of the exemplary work vehicle of FIG. 1, with the wheels leaned to an orientation corresponding to the direction of gravity (g).

As illustrated in FIG. 4, for an exemplary work operation wherein the wheels are desirably leaned because the self-propelled work vehicle 100 is operating on a slope in a banking position or otherwise during heavy grading conditions, the operator may selectively turn on the auto wheel lean option (step 330). The controller 240 checks current measured values (step 331) for each of an axle oscillation angle (e.g., 16 degrees), a steering wheel angle 180 (e.g., 0 degrees), an articulation angle 182 (e.g., 0 degrees), a slope of the terrain (e.g., 30 degrees), and a wheel lean angle (initially, e.g., 0 degrees). It should be noted that the values recited above are purely exemplary and are in no way limiting on the values or range of values to be expected, but are intended as illustrative for the purposes of the present discussion.

The controller 240 further may receive inputs (step 332) representative of the blade position (e.g., shifted left by {x} millimeters) and the blade angle (e.g., {y} degrees).

The controller 240 then (step 333), in accordance with the exemplary values provided above, generates output signals to open the hydraulic valves 220 for actuating the front wheels 112 to lean toward the left of the self-propelled work vehicle 100. The front wheels 112 may accordingly in step 334 be leaned by, e.g., 14 degrees (see FIG. 5) to keep the front wheels 112 oriented vertically, i.e., in a direction corresponding to the direction of gravity (g) and to maintain a straight path for the self-propelled work vehicle 100.

A feedback loop 335 may further be implemented wherein the controller 240 continuously compares measurements from the wheel lean angle sensor 214 against a target value, which typically as previously noted corresponds to the direction of gravity. The controller 240 may accordingly determine that further adjustments to the hydraulic valve(s) 220 may be necessary to achieve the desired wheel lean orientation.

Figure 6:
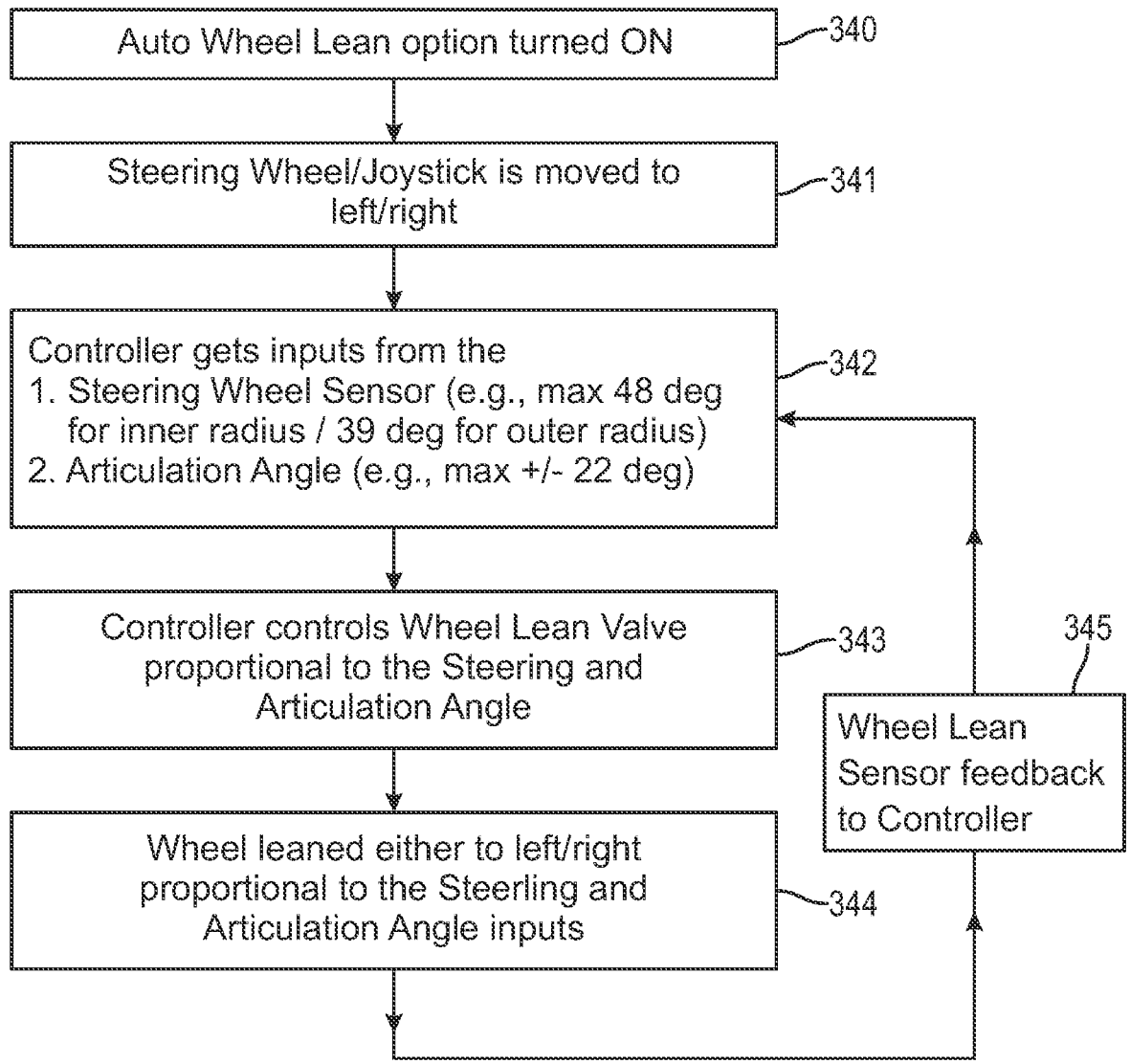
FIG. 6 is a flowchart representing an automated wheel lean control process while implementing a minimum turning radius, in accordance with the exemplary method illustrated in FIG. 3.
Figure 7:
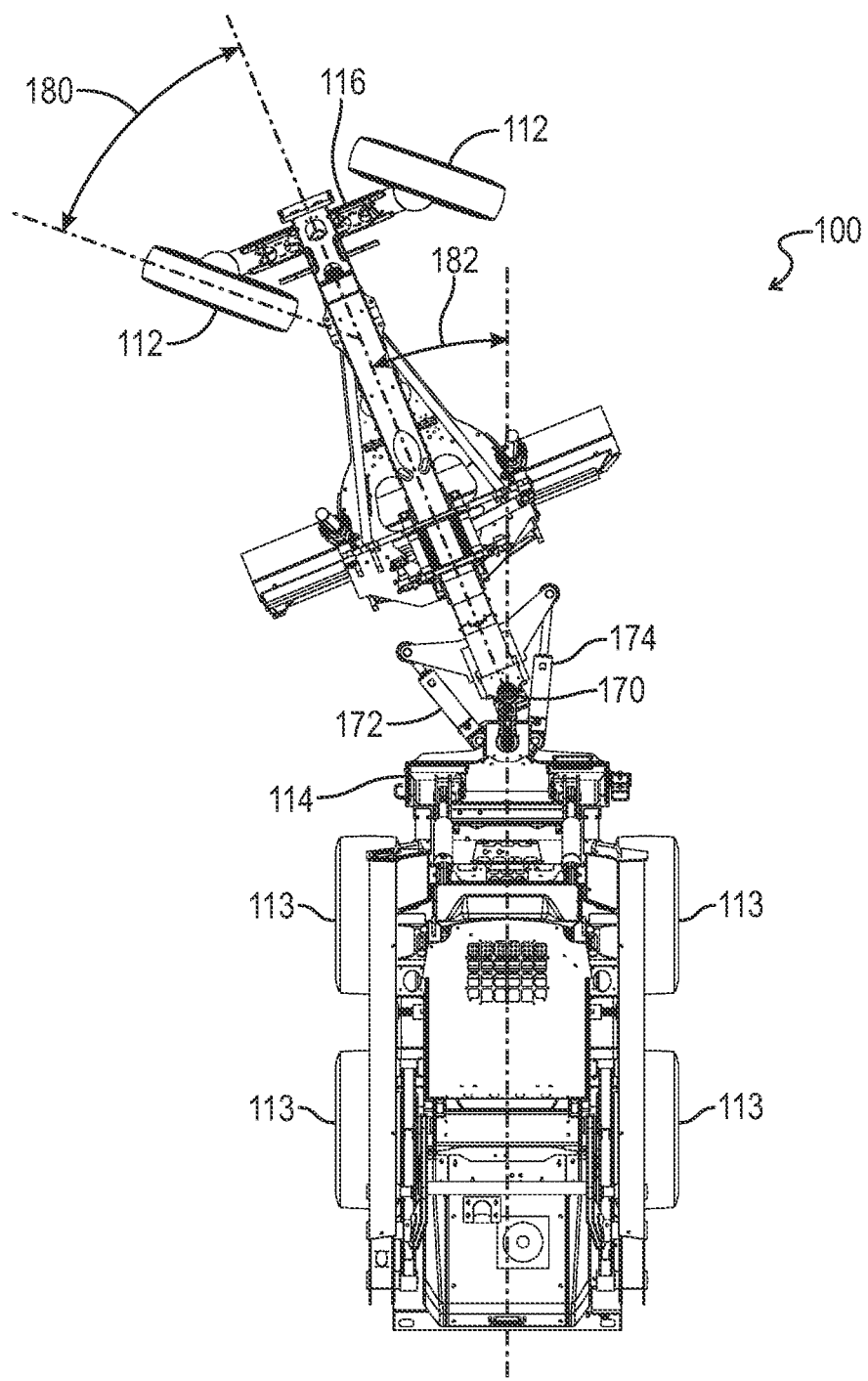
FIG. 7 is an overhead view of the exemplary work vehicle of FIG. 1, with the front portion of the work vehicle turned to a first angle relative to the main frame, and with the front wheels turned to a second angle relative to the front portion, to implement the minimum turning radius according to the process in FIG. 6.

As illustrated in FIG. 6, another exemplary work operation includes where a minimum turning radius is to be implemented while the automated wheel lean control is being provided, e.g., wherein the operator may selectively turn on the auto wheel lean option (step 340) and further moves the steering wheel, joystick, or equivalent steering interface tool to the left or right (step 341). The controller 240 obtains inputs (step 342) corresponding to the front wheel steering angle 180 (e.g., allowing a maximum of 48 degrees for the inner radius and a maximum of 39 degrees for the outer radius as shown in FIG. 7) and to the articulation angle 182 (e.g., allowing maximum values of +/−22 degrees as shown in FIG. 7). It should be noted that the values recited above are purely exemplary and are in no way limiting on the values or range of values to be expected, but are intended as illustrative for the purposes of the present discussion.

In step 343, the controller 240 in accordance with the exemplary values provided above, generates output signals to open the hydraulic valves 220 for actuating the front wheels 112 to lean (in step 344) to the left or right and proportionately with respect to the steering angle 180 and articulation angle 182. A feedback loop 345 may further be implemented wherein the controller 240 continuously compares measurements from the wheel lean angle sensor 214 against a target value, and may accordingly determine whether further/how much adjustment to the hydraulic valve(s) 220 may be necessary to achieve the desired wheel lean orientation.

Returning to FIG. 3, the operator may alternatively be enabled to select a manual operating mode ("manual" in response to the query in step 320). Selection on a manual mode may involve direct selection of such a mode from among a plurality of options, and/or may encompass a more passive intervention wherein e.g., a wheel lean lever or equivalent interface is manually adjusted and the auto wheel lean feature is accordingly overridden.

While the operator is operating the machine manually in this selected (actively, passively, or otherwise) mode, the controller 240 may monitor different inputs from the associated sensors (step 350) and learn the operator operations and preferences for wheel lean during different types of operations (e.g., heavy grading, banking operation, minimum turning radius). The aforementioned learning function may be performed via machine learning techniques through, e.g., at least a subset of multiple passes of the self-propelled work vehicle 100 in a given area, wherein relevant control data can be stored (step 360) in retrievable fashion for use in subsequent iterations/passes when the automated wheel lean function is called upon for equivalent operations. The control data would accordingly assist the current auto lean function to undertake wheel leaning decisions substantially as preferred by the operator.

For each of the aforementioned manual and automated processes, the method 300 may further include a step 370 wherein the measured wheel lean angle is displayed to the operator, along with any other values, alerts, and/or other indicia as may be deemed useful or otherwise selected by the operator during operation.

As used herein, the phrase "one or more of," when used with a list of items, means that different combinations of one or more of the items may be used and only one of each item in the list may be needed. For example, "one or more of" item A, item B, and item C may include, for example, without limitation, item A or item A and item B. This example also may include item A, item B, and item C, or item B and item C.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A work vehicle comprising:
   an axle associated with a front portion of the work vehicle;
   a plurality of traction wheels coupled to the axle and configured to lean at a wheel-lean angle relative thereto;
   a first sensor configured to generate output signals representing an actual wheel-lean angle of at least one of the plurality of traction wheels relative to the axle;
   a second sensor configured to generate output signals representing an oscillation angle of the axle;
   a third sensor configured to generate output signals representing a slope of terrain upon which the work vehicle is traveling;
   a user interface configured to enable user selection from among one or more selectable automatic control modes and at least one manual control mode; and
   a controller functionally linked to receive the respective output signals from the first sensor, the second sensor, and the third sensor,
   wherein the controller is configured, during the at least one manual mode,
      to direct a display of the actual wheel-lean angle on the user interface,
      to monitor manual control inputs regarding leaning of the plurality of traction wheels in accordance with current output signals from the first sensor, the second sensor, and the third sensor, and
      to store control data based on correlation of the manual control inputs with a current type of operation,
   wherein the controller is configured, responsive to a selected automatic control mode, to direct leaning of the plurality of traction wheels to a predetermined orientation, based on at least the output signals from each of the first sensor, the second sensor, and the third sensor, and
   wherein the controller is configured, during at least one of the one or more selectable automatic control modes, to further retrieve and implement the stored control data correlated with at least the current type of operation.

2. The work vehicle of claim 1, wherein the controller is configured in association with at least a first selected automatic control mode to automatically direct leaning of the plurality of traction wheels to a direction of gravity.

3. The work vehicle of claim 2, wherein the controller is configured to receive feedback from the first sensor for at least confirming the directed leaning of the plurality of the traction wheels.

4. The work vehicle of claim 1, wherein the first sensor comprises an encoder integrated within a hydraulic cylinder associated with at least one of the plurality of traction wheels.

5. The work vehicle of claim 1, wherein:
the front portion of the work vehicle is articulable relative to a rear portion of the work vehicle, and
the controller is configured to automatically direct leaning of the plurality of traction wheels further based on detected steering inputs for positioning of the plurality of traction wheels and a detected articulation angle for positioning of the front portion of the work vehicle relative to the rear portion.

6. The work vehicle of claim 5, wherein:
the third sensor comprises an inertial measurement unit configured to generate output signals further representing a yaw rotation of a respective portion of the work vehicle about an axis transverse to a working direction of the work vehicle and substantially normal to the terrain, and
the controller is further configured to determine a target yaw rotation based on the detected steering inputs and the detected articulation angle, and to direct leaning of the plurality of traction wheels based at least in part on a comparison of a detected yaw rotation with respect to the target yaw rotation.

7. The work vehicle of claim 6, wherein the third sensor is mounted on the rear portion of the work vehicle.

8. The work vehicle of claim 1, wherein:
the controller is configured, responsive to a selected first automatic control mode, to direct leaning of the plurality of traction wheels to a direction of gravity, based on at least the output signals from the first sensor, the second sensor, and the third sensor,
the front portion of the work vehicle is selectively articulable relative to a rear portion of the work vehicle, and
the controller is configured, responsive to a selected second automatic control mode, to direct leaning of the plurality of traction wheels at least proportionate with respect to detected steering inputs for positioning of the plurality of traction wheels and a detected articulation angle for positioning of the front portion of the work vehicle relative to the rear portion.

9. The work vehicle of claim 8, wherein the controller is configured to receive feedback from the first sensor during the selected second automatic control mode for at least confirming the directed leaning of the plurality of traction wheels.

10. A method of automatically controlling wheel lean in a work vehicle comprising an axle associated with a front portion of the work vehicle, and a plurality of traction wheels coupled to the axle and configured to lean at a wheel-lean angle relative thereto, the method comprising:
detecting, based on output signals from one or more sensors mounted on the work vehicle, work conditions comprising an actual wheel-lean angle of at least one of the plurality of traction wheels relative to the axle, an oscillation angle of the axle, and a slope of terrain upon which the work vehicle is traveling;
enabling, via a user interface, user selection from among one or more selectable automatic control modes and at least one manual control mode;
during the at least one manual control mode, monitoring manual control inputs regarding leaning of the plurality of traction wheels in accordance with associated work conditions, and storing control data based on correlation of the manual control inputs with a current type of operation;
responsive to a selected automatic control mode, automatically directing leaning of the plurality of traction wheels to a predetermined orientation, based on at least the detected work conditions; and
during at least one of the one or more selectable automatic control modes, implementing the stored control data responsive to at least the current type of operation.

11. The method of claim 10, comprising responsive to at least a first selected automatic control mode, automatically directing leaning of the plurality of traction wheels to a direction of gravity, based on at least the detected work conditions.

12. The method of claim 11, wherein the front portion of the work vehicle is articulable relative to a rear portion of the work vehicle, the method further comprising:
automatically directing leaning of the plurality of traction wheels further based on detected steering inputs for positioning of the plurality of traction wheels and a detected articulation angle for positioning of the front portion of the work vehicle relative to the rear portion.

13. The method of claim 12, wherein the detected work conditions further comprise a yaw rotation of a respective portion of the work vehicle about an axis transverse to a working direction of the work vehicle and substantially normal to the terrain, and the method further comprises:
determining a target yaw rotation based on the detected steering inputs and the detected articulation angle, and
directing leaning of the plurality of traction wheels based at least in part on a comparison of a detected yaw rotation with respect to the target yaw rotation.

14. The method of claim 10, further comprising:
at least during the at least one manual control mode, directing a display of the actual wheel-lean angle on the user interface.

15. The method of claim 14, further comprising:
during the at least one manual control mode, monitoring manual control inputs regarding leaning of the plurality of traction wheels in accordance with associated work conditions, and storing control data based thereon, and
during at least one of the one or more selectable automatic control modes, implementing the stored control data responsive to the associated work conditions.

16. The method of claim 10, wherein:
a selected first automatic control mode comprises automatic directing of the leaning of the plurality of traction wheels to a direction of gravity, based on the detected work conditions,
the front portion of the work vehicle is selectively articulable relative to a rear portion of the work vehicle, and
the method further comprises, responsive to a selected second automatic control mode, automatically directing leaning of the plurality of traction wheels at least proportionate with respect to detected steering inputs for positioning of the plurality of traction wheels and a detected articulation angle for positioning of the front portion of the work vehicle relative to the rear portion.

17. The work vehicle of claim 1, wherein the current type of operation is determined from among different types of operations comprising a heavy grading operation, a banking operation, and a minimum turning radius operation.

18. A work vehicle comprising:
- an axle associated with a front portion of the work vehicle, wherein the front portion of the work vehicle is selectively articulable relative to a rear portion of the work vehicle;
- a plurality of traction wheels coupled to the axle and configured to lean at a wheel-lean angle relative thereto;
- a first sensor configured to generate output signals representing an actual wheel-lean angle of at least one of the plurality of traction wheels relative to the axle;
- a second sensor configured to generate output signals representing an oscillation angle of the axle;
- a third sensor configured to generate output signals representing a slope of terrain upon which the work vehicle is traveling;
- a user interface configured to enable user selection from among a plurality of selectable automatic control modes and at least one manual control mode; and
- a controller functionally linked to receive the respective output signals from the first sensor, the second sensor, and the third sensor,
- wherein the controller is configured, at least during the at least one manual control mode to monitor manual control inputs regarding leaning of the plurality of traction wheels in accordance with current output signals from the first sensor, the second sensor, and the third sensor, and to store control data based on correlation of the manual control inputs with a current type of operation,
- wherein the controller is configured, responsive to at least a selected first automatic control mode of the plurality of selectable automatic control modes, to direct leaning of the plurality of traction wheels to a direction of gravity, based on at least the output signals from each of the first sensor, the second sensor, and the third sensor,
- wherein the controller is configured, responsive to at least a selected second automatic control mode of the plurality of selectable automatic control modes, to direct leaning of the plurality of traction wheels at least proportionate with respect to detected steering inputs for positioning of the plurality of traction wheels and a detected articulation angle for positioning of the front portion of the work vehicle relative to the rear portion, and
- wherein the controller is configured to retrieve and implement the stored control data during at least one of the first and second selectable automatic control mode, further responsive to the current type of operation.

19. The work vehicle of claim 18, wherein the current type of operation is determined from among different types of operations comprising a heavy grading operation, a banking operation, and a minimum turning radius operation.

20. The work vehicle of claim 18, wherein:
- the third sensor comprises an inertial measurement unit configured to generate output signals further representing a yaw rotation of a respective portion of the work vehicle about an axis transverse to a working direction of the work vehicle and substantially normal to the terrain, and
- the controller is further configured to determine a target yaw rotation based on the detected steering inputs and the detected articulation angle, and to direct leaning of the plurality of traction wheels based at least in part on a comparison of a detected yaw rotation with respect to the target yaw rotation.

* * * * *